Dec. 25, 1956  F. SINISTERRA  2,775,317
SHOCK AND VIBRATION DAMPING DEVICE
Filed July 18, 1951  2 Sheets-Sheet 1
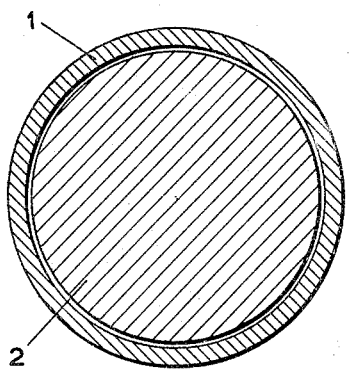
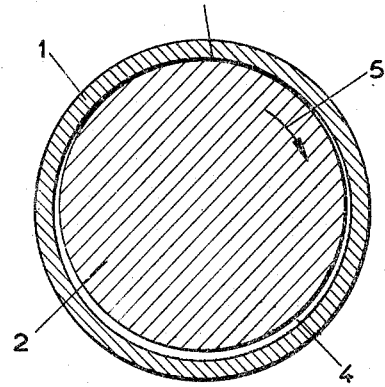
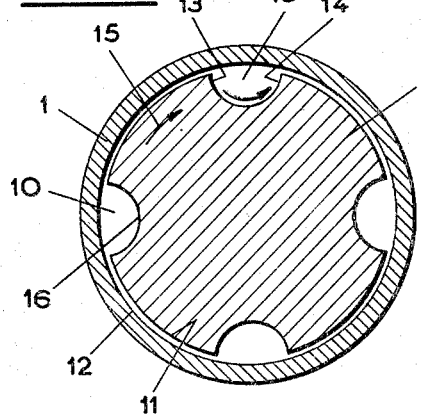
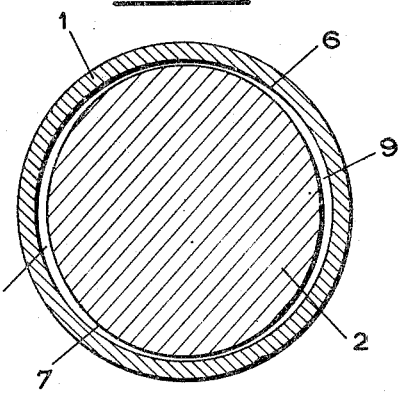
FEDERICO SINISTERRA
INVENTOR
BY HASELTINE, LAKE & CO.
AGENTS Dec. 25, 1956  F. SINISTERRA  2,775,317
SHOCK AND VIBRATION DAMPING DEVICE
Filed July 18, 1951  2 Sheets-Sheet 2

FEDERICO SINISTERRA
INVENTOR
BY HASELTINE, LAKE & CO.
AGENTS.

United States Patent Office 2,775,317
Patented Dec. 25, 1956

2,775,317

SHOCK AND VIBRATION DAMPING DEVICE

Federico Sinisterra, Sete, France

Application July 18, 1951, Serial No. 237,310

Claims priority, application France November 24, 1950

1 Claim. (Cl. 188—90)

This invention relates to damping devices specifically intended to brake the relative motion between two parts or groups of parts as for example in a motor vehicle.

The operation of such devices should be very gradual in order to provide a perfectly continuous damping action. Such damping devices should also operate consistently whatever may be the conditions of use and particularly regardless of temperature changes within a normal range. This ability is especially essential for use in automobiles wherein a damping device has to operate in a uniform manner and is also important for aircraft landing gears. It will be appreciated that consistent operation will reduce the amount of upkeep and overhauling which is more necessary.

Such devices should be readily and accurately adjustable in order to easily meet particular conditions of service. Furthermore, the mass production of such devices, chiefly in the case of automobiles, must result in a low cost at a high speed of manufacture. Such devices should, therefore, include only simple elements in small numbers and allow an easy machining thereof, without any highly accurate adjustment, and also an easy mounting.

The present invention has for its object a novel article of manufacture constituted by a shock and vibration damper exhibiting the above mentioned properties to a high degree, said damper being characterized by the fact that the two co-operating surfaces of the members respectively positively associated with the elements, the relative motion of which is to be damped, are provided with no machined anchoring means, said members being separated by a narrow gap filled with very viscous material, for instance an elastic bouncing putty of the elastomer type, preferably a silicone.

In the following description, the above mentioned surfaces will be termed "smooth surfaces," it being understood that this expression designates any surface, whether polished or comparatively smooth, that is normally obtained through tool-machining or through casting, and wherein no recess, hollow, opening, corrugation or the like is a priori purposely provided. The viscous material thus utilized adheres energetically to said thus provided surfaces, without using any anchoring means.

This characteristic feature clearly distinguishes the dampers according to the invention from other dampers filled with a liquid or viscous material, and wherein are provided on the cooperating surfaces anchoring means that require a further machining and which have to be filled with said liquid or viscous material, with a view toward producing the desired damping action; such dampers are costly because the formation of the anchorage and the use of a comparatively considerable amount of filling material result in an increased cost of production, including the cost of buying the material which is expensive.

In contradistinction, generally, the thickness of the layer of the damping agent in apparatus of the invention is appreciably reduced. When the two cooperating surfaces are smooth, the thickness of the layer is regular and may be very small; it is thus possible to increase the efficiency of the damping, which is smoother and more regular than in the case of an anchorage, as the engagement of teeth or grooves is not felt as is the case with dampers of known types.

Generally speaking, the two surfaces registering with each other are smooth and the damping material located between them forms on each of them a continuous adherent and stationary boundary layer, the damping being produced by the gradual shearing of the intermediary layers of material.

It is possible to make the following general remarks about dampers provided in accordance with the invention:

The thickness of the layer of damping material housed between the two cooperating surfaces is preferably between .5 and 3 millimeters.

Furthermore, it is possible to use a rotor eccentrically disposed with reference to the casing containing it; preferably such a rotor has no groove, since the eccentrical arrangement results in a considerable increase of the damping efficiency by reason of the extra pressure to which the damping material is submitted during the relative displacement between the casing and the rotor. With an eccentric arrangement, spaces of maximum and spaces of minimum thickness are created between both casing and rotor member in relative motion. When said members are of circular section, two such spaces are thus provided; there are four such spaces when the rotor assumes, for instance, an oval shape, such spaces increasing in number and diminishing in extent as the number of salient portions at the periphery of the rotor increases; when the rotor is thus eccentered, the thickness of the damping material may reach 3 millimeters at the location where the thickness is the greatest.

Also, in order to increase the damping effect, it is possible to increase the pressure to which the damping material is submitted by means of pistons, thumb screws and the like acting on said material and allowing an adjustment of the damper.

However, it is possible to obtain a high efficiency for a damper embodying the features of the present invention without resorting to such compression means as experience shows that the pressure that is strictly required for obtaining a proper filling of the device, is sufficient for properly operating the latter.

When the dampers according to the invention are not likely to be submitted to any considerable variations in temperature, for instance when they form part of the equipment of automobiles (especially when used under moderate climatic conditions), they are but slightly sensitive to such variations of temperature as the damping material used shows a considerable coefficient of expansion, whereby its pressure increases in direct relationship with the temperature and sufficiently compensates for the action of its variation in viscosity. However, it is possible to resort to a thermostatic system relying on the use for the two cooperating parts of metals or alloys the coefficients of the thermic expansion of which are respectively different.

On the other hand, and as a consequence of this experimentation, applicant has been led to the following conclusions.

Very satisfactory results are obtained by using as a damping medium an elastic material of the elastomer type such as a silicone bouncing putty, the viscosity of which material is of the magnitude of say 300,000 poises at 20° C., such material exhibiting furthermore, the property of instantaneous self-welding through mere juxtaposition and a viscosity ratio between —40° C. and +80° C. that does not rise above 30.

A damper intended for automobiles may operate perfectly with 20 grams of the above mentioned putty, at a maximum, this small amount constituting a considerable advantage by reason of the high cost of the product.

By reason of the high degree of damping obtained, it is possible to produce a very flat damper, the appearance of which is similar to that of the old-fashioned friction dampers, which simplifies to a considerable extent the mounting of the apparatus.

Generally speaking and for small internal pressures, the damping is exactly proportional to the speed of displacement; when the internal pressure rises, the linear characteristic of the damping is merely shifted in parallel with itself. The action of dampers according to the invention is, therefore, perfectly gradual and they absorb much better the shocks at all running rates than the usual hydraulic damper.

The comparison between known dampers and the dampers according to the present invention makes the advantages of the latter clear with regard to simplicity, strength, stability, dependability, ease of adjustment and cost price.

These and other features and advantages of the invention will be better understood in connection with the following description, given solely by way of a non-limitative example, based on the accompanying drawings, wherein:

Figs. 1 to 4 show diagrammatically the general arrangement of rotary dampers according to the invention;

Figure 5:
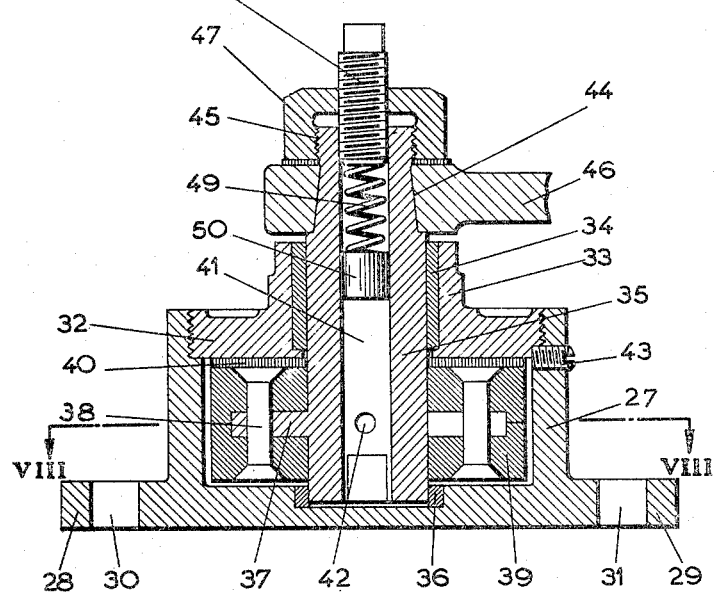
Fig. 5 is an axial cross-section through line VII—VII of Fig. 6 of a damper provided with compensating means in function of the temperature, in which damper the damping material is submitted to pressure.

In Fig. 1, 1 designates the casing of a damper in which casing a rotor 2 is adapted to revolve. The rotor is centrally carried inside the casing, and the cooperating surfaces of the two members are "smooth." These surfaces are separated by a narrow gap the breadth of which is from five tenths to 3 millimeters and the gap is filled with the plastic material to be used.

This material forms on each of the two surfaces an adherent boundary layer. When the rotor turns inside the casing, the boundary layer which covers it moves in unison therewith, thus creating a shearing force acting between each boundary layer and the adjacent intermediary layer of plastic material. As the layers instantaneously unite as soon as they have been submitted to a relative shifting, the shearing is continuous throughout the duration of the movement of the rotor and the damping action thus obtained also continues throughout this movement.

In Fig. 2, the cylindrical rotor 2 has a diameter that is smaller than the inner diameter of the casing 1, and this rotor 2 is eccentrically located within the casing 1, so as to come almost into contact with the inner wall of the casing along a line such as 3, where the clearance reaches say 1 millimeter as disclosed hereinabove. At the diametrically opposite region 4, the breadth of the gap separating the two cooperating surfaces is preferably equal to three millimeters at the utmost. If it is supposed that the rotor turns inside the casing in the clockwise direction, as shown by the arrow 5, the generating line 3 similarly moves in the clockwise direction, and the cooperation between the casing and the rotor results in the scraping of the material lying immediately ahead of said contacting line. Said material is thus driven clockwise, which provides throughout the periphery of the rotor and casing a gyratory movement of the material the adjacent layers of which are sheared. The layers are shifted at a relative speed that is higher than in the case of Fig. 1, as the intensity of damping is still higher in the present case, provided all other conditions being unchanged.

The rotor 2 of Fig. 3 assumes an oval shape and it positively or substantially comes into contact at 6 and 7 with the inner wall of the casing 1; but in a plane perpendicular to it, it leaves two open spaces 8 and 9 the thickness of which may reach 3 mm., as disclosed. This rotor operates in the same manner as that shown in Fig. 2, but its intensity of damping is practically double.

Fig. 4 illustrates a rotor provided with grooves 10; the respective cooperating surfaces 11 and 12 of the rotor and of the casing are substantially fitted inside one another so that practically no material remains between them. The edges 13 and 14 of each groove are symmetrical and substantially perpendicular to the opposed part of the inner surface 12 of the casing. The putty carried within said grooves adheres through a thin boundary layer to the surfaces defining said grooves. When the rotor 2 rotates with reference to the casing 1 in the direction of the arrow 15, the edge of each groove scrapes over the boundary layer of putty adhering to the surface 12, thus producing thereby a certain overpressure within the space adjacent to the edge 13. This boundary layer immediately reforms itself along the edge 14 and the putty is thus submitted inside the groove to a continuous rotary movement, the different intermediary layers being sheared along the boundary layer adhering to the inner surface 16 of the groove; the result of this shearing effect together with that of the shearing along the boundary layer adhering to the inner surface 12 produces a very powerful damping action.

The above described figures show diagrammatically how it is possible to design a damper in accordance with the invention, but further obvious modifications may also be provided. Thus, it is possible to form the grooves in the casing and no groove in the rotor. There will now be described with further detail, certain types of dampers shown by way of exemplification and embodying the present invention.

Figure 6:
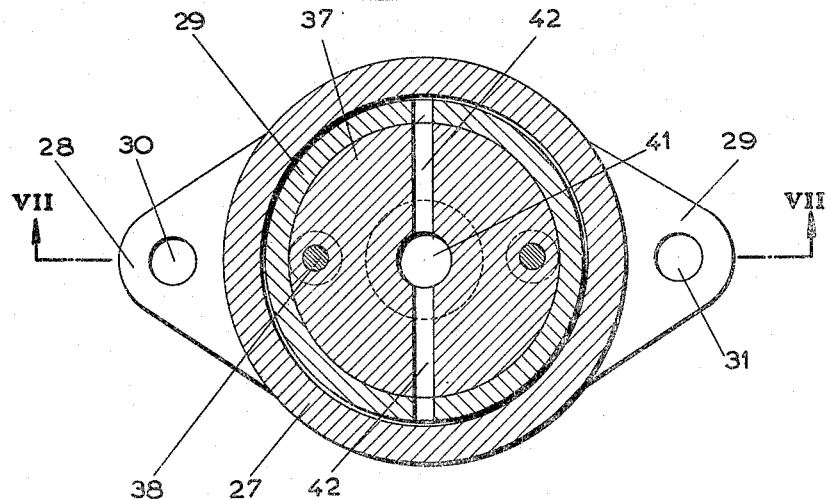
Fig. 6 is a cross-section on the line VIII—VIII of Fig. 5.

Figs. 5 and 6 illustrate a shock damper embodying a thermostatic system compensating for the variations in viscosity due to temperature changes, in which damper the putty is supposed to be submitted constantly to pressure.

Such damper includes a casing 27 for instance of steel cast integral with two securing lugs 28 and 29 provided with holes 30 and 31, respectively. This casing is closed by a screwed cover 32 having a boss 33 inside which is fitted a bearing ring 34, made, for instance, of bronze. The shaft 35 of the rotor rotates within said ring and is also held by means of another ring 36 housed inside a recess in the bottom of the casing. A collar 37 is integral with the shaft 35 and there is secured thereto through the agency of rivets 38 a cast drum 39, made, for instance, of a light alloy having a high coefficient of expansion. When the temperature of the putty increases, either by reason of the rise in ambient temperature or by reason of the work performed, the viscosity of said putty is slightly reduced which results in a reduction of the damping strength; but the drum 39 expands to a larger extent than the casing 27 and the volume available for the putty is reduced. This putty is thus submitted to a larger pressure which compensates for its loss of viscosity.

A sealing washer, made, for instance, of fiber, is urged by the drum 39 against the cover 32 under the action of the pressure exerted by the damping material even when this pressure is small. Within the shaft 35 is an axial bore 41 communicating through radial passages 42 with the periphery of the drum 39. The putty is introduced through the bore 41, and the radial passages 42 lead it into the annular space between the drum 39 and the casing 27. The air imprisoned within the casing 27 is allowed to escape through a port which is subsequently closed by a threaded plug 43. The upper part of the shaft 35 terminates in a portion 44 having a square-shaped cross-section with sloping outer faces, and capped by a threaded portion 45. A lever 46, one end thereof having an opening the square contour of which is complementary to that of the square portion 44, is fittingly mounted on the latter at said end; at its other end, the lever 46 is connected with the member of which it is desired to damp the vibrations with reference to the member positively associated with the casing 27. A tapped cap 47 is screwed over the end 45 of the rotor shaft and holds the lever 36 in position. This cap is in its turn provided with a tapping inside which is screwed a threaded pusher member 48 acting through the agency of a spring 49 on a piston operating in the bore 41. By adjustably screwing the pusher member 48, it is possible to modify the thrust exerted by the piston 50 on the putty contained inside the bore 41, thereby adjusting the damping strength to any desired value.

There will now be obvious to those skilled in the art many modifications and variations utilizing the principles set forth and realizing many or all of the objects and advantages of the invention but which do not depart esentially from the spirit of the invention.

What I claim is:

A device for damping the relative motion between two bodies comprising a casing connectable to one of the bodies and internally having smooth exposed bottom and peripheral faces and defining a cylindrical cavity of circular cross-section, a collar having an inner face, engaging said casing and covering said cavity, said collar defining a central cylindrical opening coaxial with said cylindrical cavity, a rotor having a cylindrical drum portion of circular cross-section and smooth faces, at its inner end, of slightyl smaller proportions than said cylindrical cavity and extending therein so as to define a minimum gap of substantially constant dimension of from five tenth to three millimeters between the inner smooth peripheral face of said casing and the outer smooth peripheral face of said drum portion, and a stepped shaft portion of reduced circular cross-section outwardly extending from said drum portion, at its outer end, and coaxial with said drum portion and fitted for coaxial rotation in said central cylindrical opening, washer means for sealingly engaging the shaft end face of said drum portion with said inner face of said collar, a material in the gap having a dynamic viscosity of substantially 300,000 poises at 20 degrees centigrade and adherable to said casing and said drum portion at a critical applied pressure, externally adjustable spring controlled means for applying the critical minimum pressure, the outer end of said shaft portion being connectable to the other of said bodies, and a closable escape vent in said casing for permitting the escape of air for the entry of material into the gap.

References Cited in the file of this patent

UNITED STATES PATENTS

| | | |
|---|---|---|
| 1,407,320 | Bouche | Feb. 21, 1922 |
| 1,428,225 | Fulton | Sept. 5, 1922 |
| 1,807,945 | Trumble | June 2, 1931 |
| 2,125,617 | Niemann | Aug. 2, 1938 |
| 2,253,001 | Webb et al | Aug. 19, 1941 |
| 2,469,488 | Woods | May 10, 1949 |
| 2,507,182 | Young | May 9, 1950 |
| 2,514,138 | O'Connor | July 4, 1950 |
| 2,628,486 | Huff | Feb. 17, 1953 |
| 2,631,690 | Dunham | Mar. 17, 1953 |
| 2,699,846 | Pitman et al | Jan. 18, 1955 |

FOREIGN PATENTS

| | | |
|---|---|---|
| 136,834 | Australia | Mar. 27, 1950 |
| 776,210 | France | Jan. 21, 1935 |
| 942,662 | France | Sept. 20, 1948 |
| 385,894 | Great Britain | Jan. 5, 1933 |

OTHER REFERENCES

Product Engineering of January 1950 (pages 90–93).